Figure 1:
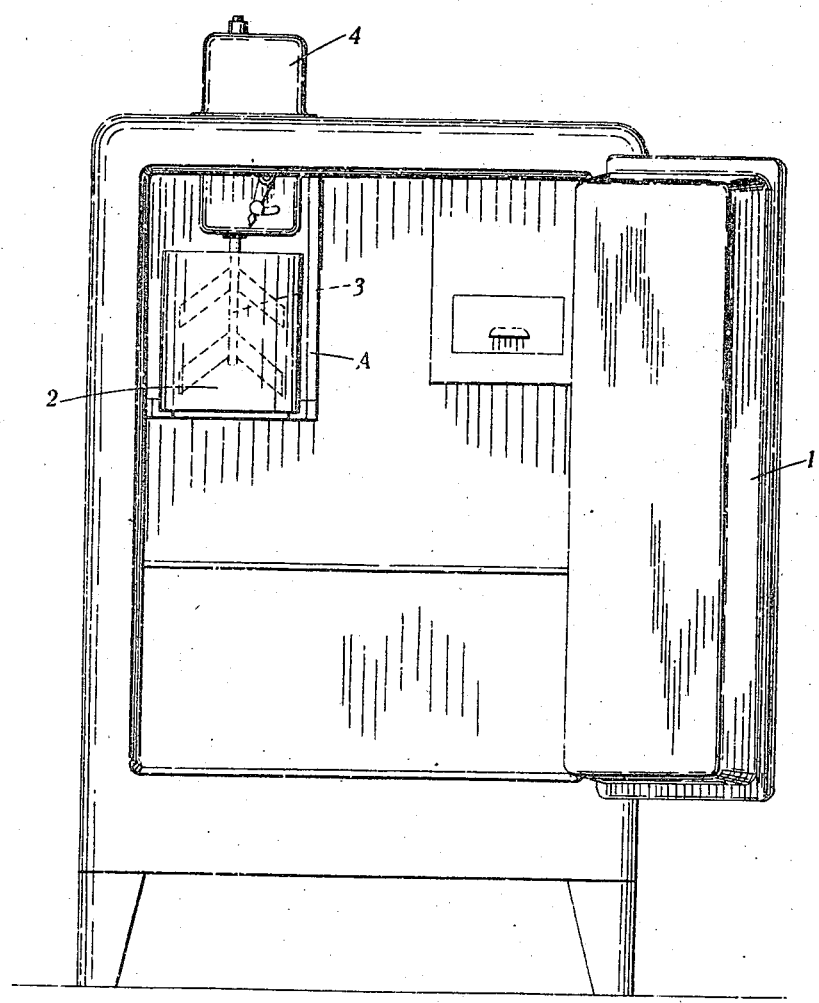

Feb. 10, 1942.   L. W. REINKEN ET AL   2,272,614
REFRIGERATOR
Filed Sept. 13, 1939   2 Sheets-Sheet 1

Inventors
L. W. Reinkin
J. S. Jammer
by
Attorney

Feb. 10, 1942. L. W. REINKEN ET AL 2,272,614
REFRIGERATOR
Filed Sept. 13, 1939    2 Sheets-Sheet 2
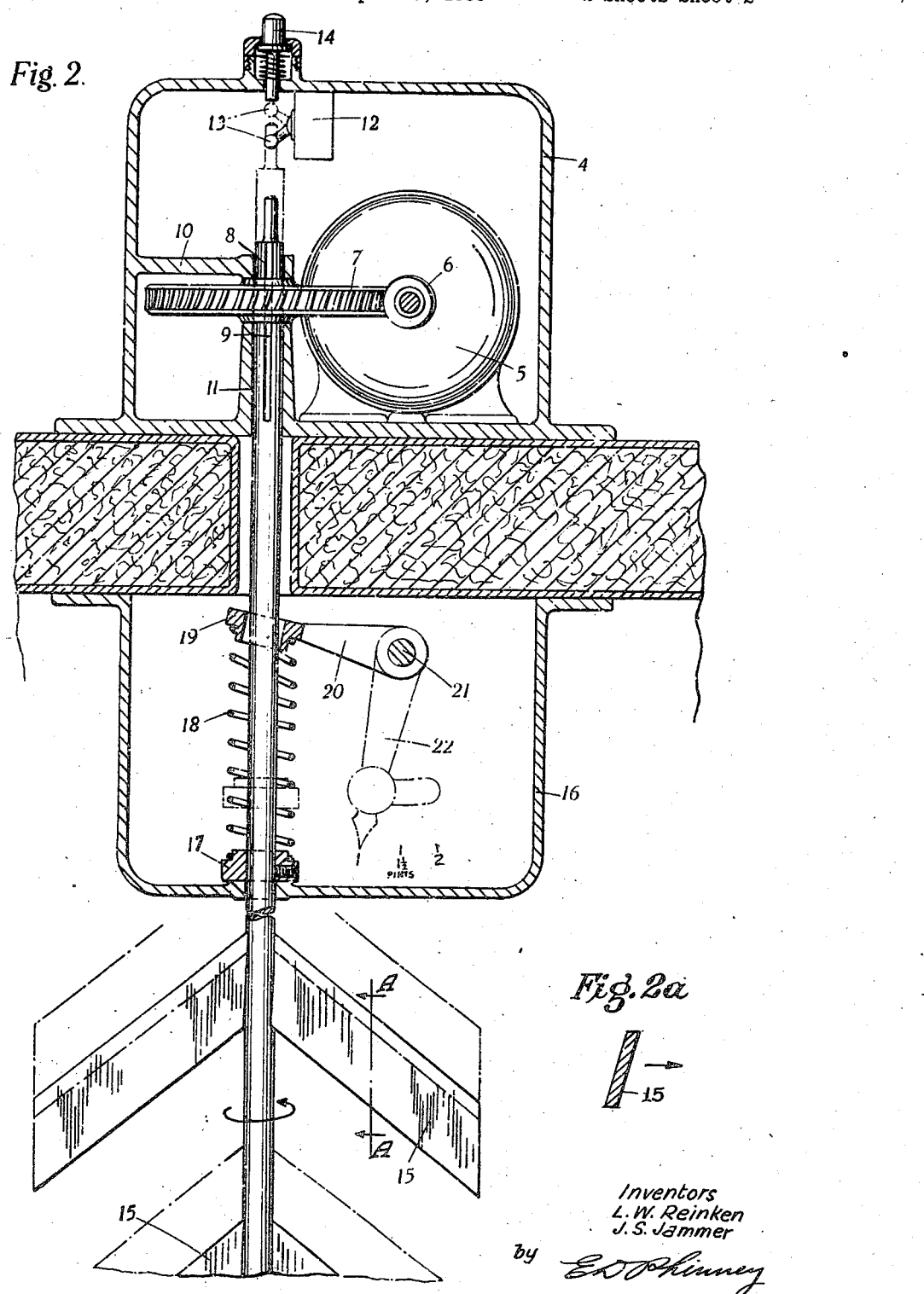
Inventors
L. W. Reinken
J. S. Jammer
Attorney Patented Feb. 10, 1942

2,272,614

UNITED STATES PATENT OFFICE 2,272,614

REFRIGERATOR

Louis William Reinken and Jacob Suter Jammer, London, England, assignors to International Standard Electric Corporation, New York, N. Y.

Application September 13, 1939, Serial No. 294,648
In Great Britain September 16, 1938

7 Claims. (Cl. 62—114)

This invention relates to refrigerators and particularly to household refrigerators which generally contain several shelves and a freezing chamber so that food stored on the shelves will be kept cold but generally above freezing point while the temperature in the freezing chamber falls below 32° F.

The freezing chamber may be employed for making ice cream or other delicacies that require freezing but up to the present trouble has been experienced in obtaining a satisfactory result because no provision is made for stirring the mixture during freezing. It is rather unsatisfactory and often inconvenient to keep opening the door of the refrigerator to stir the contents of the freezing chamber and in any case such a procedure might result in unsatisfactory ice cream which requires steady stirring rather than an irregular intermittent beating. An object of this invention is to provide a household refrigerator in which continuous stirring of the contents of a container disposed therein may be effected.

According to the invention we provide a household refrigerator into which projects an electrically operated stirring device arranged to effect stirring of the contents of a container disposed therein. Preferably the stirring device projects into a special freezing chamber disposed in the refrigerator. The stirring device may comprise a shaft provide with laterally projecting stirring arms, hereinafter referred to as paddles, arranged and shaped to give a thrust along the shaft during stirring. An electric motor may be conveniently disposed adjacent to the refrigerator, for example, it may be secured to the back thereof and this motor, which may be geared down, is arranged in operation to drive the stirring shaft carrying the paddles. The motor may be started by depressing a suitable switch after placing the container in position within the freezing chamber. The switch may be an ordinary toggle action switch arranged to start the motor when operated in one direction and to stop the motor when operated in the opposite direction. Preferably the stopping of the motor when making ice cream or the like is effected automatically when the ice cream attains a certain consistency, the outward thrust of the paddles along the shaft increases as the ice cream thickens until a point is reached at which the outward thrust is sufficient to operate the switch to stop the motor.

In one particular embodiment the motor and toggle action switch may be disposed above the refrigerator outside the casing thereof with the stirring shaft projecting downwardly into the freezing chamber. A container of ice cream mixture is placed in position, a suitable support being provided in the freezing chamber, and the toggle switch depressed to start the motor after which stirring of the ice cream continues until the upward thrust due to the paddles is sufficient to overcome the pull of gravity on the shaft and paddles or the pull of gravity and the force of a tensional spring which may be attached to the shaft to move the shaft upwardly to operate the toggle switch thus opening the motor circuit.

The paddles must give an effective area for stirring and should if automatic shutoff is desired (for making ice cream for example), have suitable angles to develop the required thrust.

In order that the invention may be clearly understod and readily carried into effect, reference is now directed to the accompanying drawings in which Figure 1 is a front view of a household refrigerator embodying the invention with the door of the refrigerator open and Figure 2 is a detail sectional view of the mechanism for operating the stirring device drawn to an enlarged scale. Figure 2ª is a sectional view taken along line A—A of Figure 2.

Referring first to Figure 1, it will be observed that the refrigerator indicated generally by the reference 1 is provided internally thereof with a freezing chamber A in which an ice cream container 2 is disposed and into which a stirring device 3 projects, an electric motor 5 (see Fig. 2) for operating the stirring device 3 being housed within a casing 4 disposed at the top of the refrigerator 1.

In Figure 2 the operating mechanism is shown in detail and it will be noted that the armature of the electric motor 5 is provided at one end thereof with a worm 6 to mesh with a worm wheel 7 upon the upper end of the shaft 8 of the stirring device 3. The shaft 8 is connected by splines 9 to the worm wheel 7 which is held in position by bracket members 10 and 11 forming bearings for the shaft 8, which is, therefore, slidable relatively to the worm wheel 7.

The housing 4 is provided in the upper wall thereof with a toggle action switch 12 the operating lever 13 of which is disposed axially above the upper end of the shaft 8 and a spring controlled push button 13 is provided, depression of which moves the operating lever 13 into its downward position to complete the electric circuit of the motor 5. As shown generally in Figure 1 and in detail in Figure 2 the shaft 8 is provided at its lower end with paddles 15 which form stirrers for ice cream or the like within the container 2, the paddles being preferably arranged and shaped to impart a thrust longitudinally of the shaft and towards the toggle switch 12 during stirring.

The shaft 8 extends through a casing 16 which in the example shown is secured to the underside of the top of the refrigerator and is provided with a collar 17 upon which rests a spring 18 coiled round the shaft 8 and limited at its upper end by a collar 19 which loosely surrounds the shaft 8 and forms one end of a lever 20 secured to a stub shaft 21 which extends through the casing 16. It will be understood from the above that the upward thrust longitudinally of the shaft has to overcome both gravity and the spring 18 before moving the shaft 8 upwardly so that a certain predetermined consistency must be attained by the ice cream or the like in the container before the motor is stopped. It will on the other hand be appreciated that the thrust due to two pints of ice cream or the like will, for a given consistency, be greater than the thrust due to a single pint of ice cream or the like, unless the position of the paddles has been adjusted. In order to overcome this difficulty the stub shaft 21 is provided with a pointer 22 adapted to be moved over a scale marked on the outside of the casing 16. In operation the pointer 22 should be set at the required calibration which will have the effect of setting the upper collar 19 at the correct position, so that the greater the amount of ice cream or the like to be prepared the greater is the compression of the spring in order to compensate for the added thrust due to the additional amount of ice cream or the like in the container 2.

In operation let it be supposed that the container 2 filled with ice cream mixture is in position in the freezing chamber A and that the pointer 22 is at the correct calibration thus positioning the upper collar 19 correctly relatively to the spring 18. The push button 14 is then depressed operating the lever 13 of the toggle switch 12 and completing the electric circuit to start the motor 5, which through its armature and worm 6 meshing with worm wheel 7 rotates the shaft 8 and begins to effect stirring of the contents of the container. As the freezing progresses the consistency of the ice cream or the like thickens and the upward thrust on the shaft 8 increases with the result that the shaft is urged slowly upwards against the force of gravity and the action of the spring 18 until the upper end of the shaft 8 strikes against the lever 13 of the toggle switch and moves it into its upward or non-operative position thus breaking the electric circuit and stopping the motor.

What is claimed is:

1. A refrigerator comprising a container, refrigerating means for cooling said container, and a stirring device comprising a rotatable shaft, laterally projecting paddles on said shaft, said paddles being within said container and said shaft being longitudinally movable during rotation by pressure on said paddles, and means for driving said shaft.

2. A refrigerator comprising a container, refrigerating means for cooling said container, a stirring device comprising a rotatable shaft, laterally projecting paddles on said shaft, said paddles being within said container and said shaft being longitudinally movable during rotation by pressure on said paddles, and means for driving said shaft, and switch mechanism in the path of longitudinal movement of said shaft, said switch mechanism being operated by longitudinal movement of said shaft to stop said driving means.

3. A refrigerator comprising a freezing chamber, a container for receiving a mixture to be frozen in said chamber, a rotatable stirring shaft extending downwardly into said container, laterally projecting paddles on said shaft, said shaft being longitudinally movable during rotation thereof and said paddles being shaped to impart an upward thrust to said shaft while stirring a mixture in said container, an electric motor drivably connected with said shaft, and a switch for operating said motor having an operating lever disposed axially above said shaft whereby said switch is operated by upward movement of said shaft to stop said motor.

4. A refrigerator having wall portions and comprising a freezing chamber, a container for receiving a mixture to be frozen in said chamber, a casing attached to one of said wall portions, a rotatable stirring shaft extending through said casing and downwardly into said container, a spring coiled around said shaft within said casing, a first collar attached to said shaft and secured to the downward end of said spring, an adjustable collar secured to the other end of said spring and slidably mounted on said shaft, means for adjusting the position of said adjustable collar on said shaft, laterally projecting paddles on said shaft, said shaft being longitudinally movable during rotation thereof and said paddles being shaped to impart an upward thrust to said shaft while stirring a mixture in said container, an electric motor drivably connected with said shaft, and a switch for operating said motor having an operating lever disposed axially above said shaft whereby said switch is operated by upward movement of said shaft to stop said motor.

5. A refrigerator having wall portions and comprising a container, refrigerating means for cooling said container, a casing attached to one of said wall portions, a rotatable stirring shaft extending through said casing and into said container, a spring coiled around said shaft within said casing, a first collar attached to said shaft and secured to one end of said spring, an adjustable collar secured to the other end of said spring and slidably mounted on said shaft, means for adjusting said adjustable collar along said shaft comprising a stub shaft extending through said casing, a first lever within said casing fixed at one end to said shaft and at the other end to said adjustable collar, and a second lever outside said casing fixed at one end to said shaft and forming a pointer at the other end, laterally projecting paddles on said shaft, said paddles being within said container and said shaft being longitudinally movable during rotation by pressure on said paddles, and means for driving said shaft.

6. A refrigerator according to claim 3, characterised in this, that the electric motor is housed within a casing secured to the outside of the refrigerator.

7. A refrigerator according to claim 3, characterised in this, that the motor armature is geared to the upper end of the shaft and that the shaft is axially movable relatively to its gear.

LOUIS WILLIAM REINKEN.
JACOB SUTER JAMMER.